United States Patent [19]

McFarland et al.

[11] Patent Number: 4,458,527

[45] Date of Patent: Jul. 10, 1984

[54] APPARATUS FOR MEASURING THE ROLLING RESISTANCE OF TIRES

[75] Inventors: Lellan L. McFarland, Wadsworth; Barry D. Cargould, Akron, both of Ohio

[73] Assignee: Eagle-Picher Industries, Inc., Cincinnati, Ohio

[21] Appl. No.: 325,567

[22] Filed: Nov. 27, 1981

[51] Int. Cl.³ ............................................. G01M 17/02
[52] U.S. Cl. ............................................. 73/146; 73/9
[58] Field of Search .................... 73/146, 9, 8, 117

[56] References Cited

U.S. PATENT DOCUMENTS 3,763,699 10/1973 Sangster .............................. 73/117
4,324,128 4/1982 Langer ................................. 73/146

Primary Examiner—Donald O. Woodiel
Attorney, Agent, or Firm—Wood, Herron & Evans

[57] ABSTRACT

Apparatus for measuring the rolling resistance of tires. An endless belt is supported on rotating drums. The upper run of the belt passes over a hydrostatic bearing which supports the belt against the force of the tire pressing against it. The hydrostatic bearing is formed by a plurality of nozzles directing water at high pressure against the underside of the belt. A pressure differential is created between the upper and lower surfaces of the belt to press the belt closely adjacent the nozzles so that when a tire is pressed against the belt, it does not create a depression in the belt.

5 Claims, 5 Drawing Figures

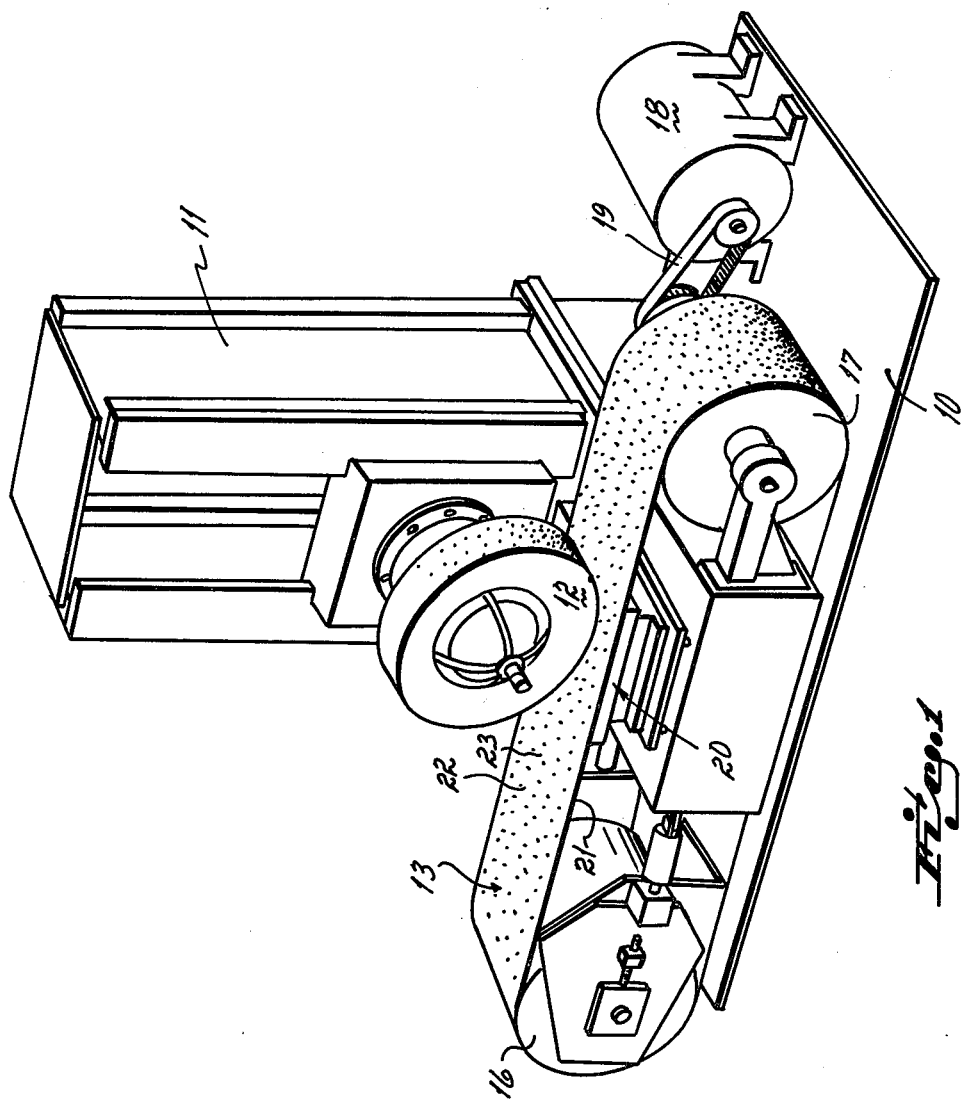

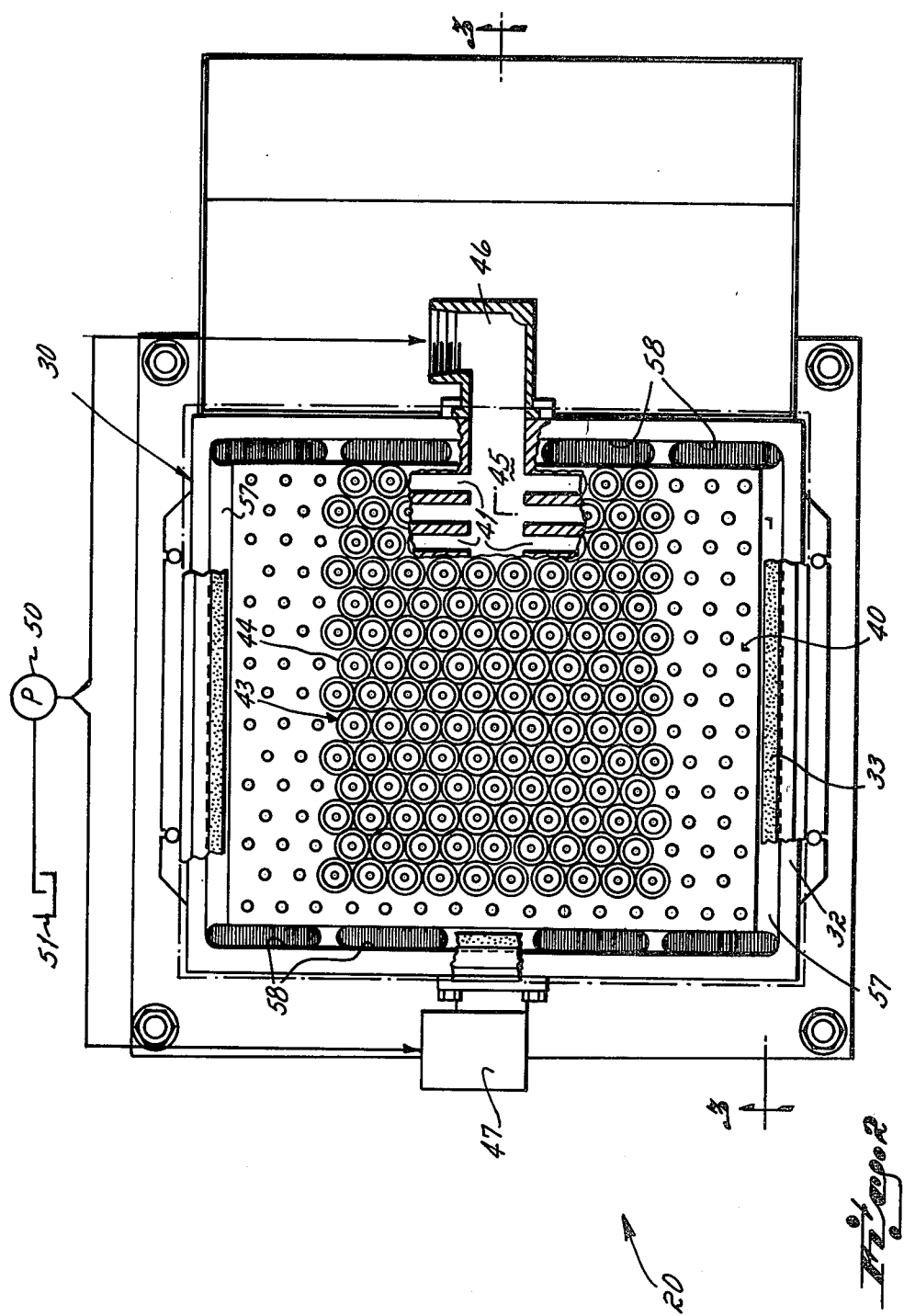

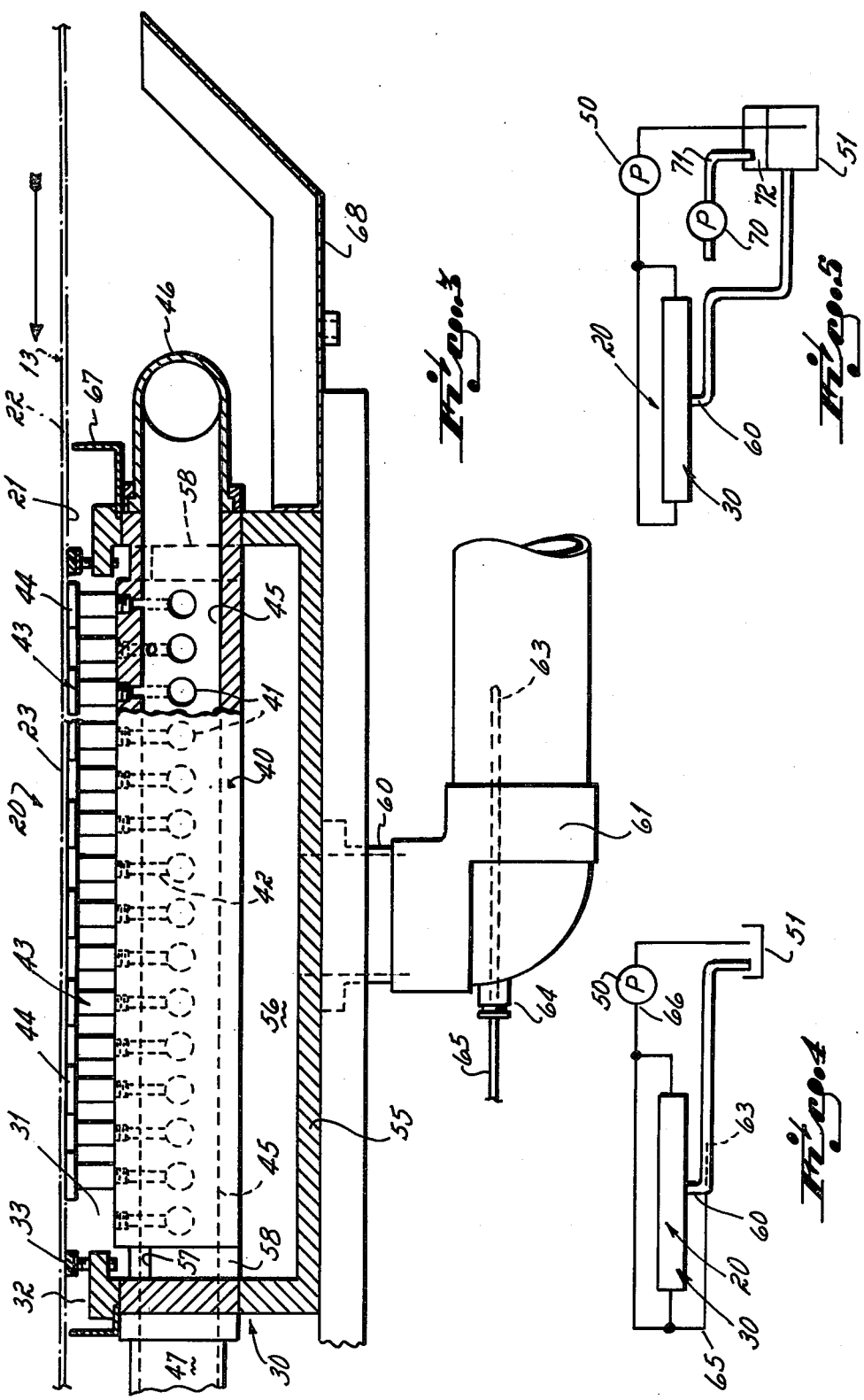

APPARATUS FOR MEASURING THE ROLLING RESISTANCE OF TIRES

This invention relates to apparatus for testing the road resistance of tires.

The configuration of tire tread can very markedly affect the rolling resistance of a tire over a highway. A vehicle whose tires have a high rolling resistance will require substantially greater amounts of fuel to be used in operating the vehicle than one whose tires have a low rolling resistance.

For many years, the tire industry has been interested in measuring the rolling resistance of tires to aid them in the proper design of tire treads. The current practice of measuring rolling resistance has been to mount a wheel of substantial diameter on a horizontal axis and to rotate that wheel while pressing the tire to be tested against it. Gauges and the like are provided to measure the resistance to rolling under different conditions of loading of the tire against the rotating wheel.

This apparatus does provide some useful information concerning the rolling resistance of a particular tire tread, but since tires normally run on a flat surface and do not run on a surface having as small as a radius as the wheel of the testing equipment, the information provided by the testing apparatus is only a rough approximation of rolling resistance. A flat surface against which to test the rolling resistance of the tire is described in U.S. Pat. No. 4,238,954. That patent discloses a flat belt mounted on drums, one of which is driven to create the relative motion between the belt and the tire. The center portion of the upper run of the belt passes over a block which presents a flat surface on which the belt rides as the tire presses against it. The patent calls for a low friction surface provided by a low friction plastic coating or by a film of water between the block and the belt, but even with such provision the friction arising from a loading of up to 2,000 pounds is still unnecessarily high.

It has been proposed to pass a belt over a hydrostatic bearing formed by a group of nozzles positioned immediately underneath the belt, the nozzles directing water under pressure against the underside of the belt. The water which is continually expressed by the individual nozzles past the belt creates a very low friction bearing surface upon which the belt can ride during the operation of the testing apparatus.

When the belt has no tire pressed against it, the force of the water will cause the belt to rise away from the nozzle a substantial distance as, for example, 0.050". When the tire is loaded against the belt, the tire will form a depression in the belt pushing it as close as about 0.001" from the nozzles. The remaining nozzles, however, will keep the belt lifted well away from the nozzles so that the tire tends to ride in a dip in the belt. Just as the tire riding against a convex wheel presents an artificial relationship between the tire and the surface, so too does a tire riding in a concave depression in a belt creating an artificial relationship between the tire and the surface upon which it rolls, thereby defeating the purpose of approaching the true running conditions of a tire on a flat road.

It has been an objective of the present invention to create a hydrostatic bearing for a flat belt, the belt remaining substantially flat when a tire is pressed against it.

This objective of the invention is attained by creating a pressure differential between the upper and lower surfaces of the portion of the belt riding on the hydrostatic bearing so that even in an unloaded condition the belt passing over the nozzles is pressed, by the pressure differential, into a position wherein it is separated from the nozzles only about 0.001". Then, when the tire is loaded against the belt, the belt will remain substantially flat since it cannot be squeezed much closer to the nozzles than about 0.001".

There are several systems by which the differential pressure can be achieved. In practice, the apparatus has a reservoir and a pump to pump water from the reservoir to the nozzles. The nozzles sit in a tank which is sealed around its upper rim with respect to the belt. Water overflowing from the tank normally proceeds through a drain, by gravity, to the reservoir. If the reservoir is sealed and evacuated, then the water in the tank below the belt will be at a pressure below atmosphere, thereby creating the desired pressure differential. Alternatively, if a portion of the water is taken from the high pressure side of the pump and is directed into the drain line toward the reservoir, a Bernoulli effect causes a reduction in the pressure in the tank below the belt, thereby resulting in the differential pressure.

Another alternative consists of a pump drawing the water out of the tank to create a low pressure underneath the belt. Still another alternative includes a pressure chamber formed above the belt to create a greater than atmospheric pressure above the belt.

The several features of the invention will become more readily apparent from the following detailed description taken in conjunction with the accompanying drawings in which:

FIG. 1 is a perspective view of the apparatus of the present invention;

FIG. 2 is a top plan view, partially broken away, of the hydrostatic bearing;

FIG. 3 is a cross-sectional view taken along lines 3—3 of FIG. 2;

FIG. 4 is a diagrammatic view of one system for creating a pressure differential on the horizontal belt; and FIG. 5 is an alternative system for creating a differential pressure on the belt.

The tire testing apparatus is illustrated generally in FIG. 1. It includes a base 10 which supports a column 11 upon which a tire 12 is rotatably mounted. The column 11 contains apparatus for loading the tire against a horizontal belt 13 and for measuring the rolling resistance of the tire as the belt passes underneath it. Such apparatus is of the type described in U.S. Pat. No. 4,238,954.

The belt 13 passes over two horizontally-spaced drums 16 and 17, the drum 17 being driven by a motor 18 through a belt 19. A hydrostatic bearing 20 is positioned adjacent the lower surface 21 of an upper run 22 of the belt 13. The belt has an upper surface 23 against which the tire is pressed during the operation of the apparatus.

In the operation of the machine thus far described, the motor drives the belt at speeds up to about 80 miles an hour. The tire can be loaded in different directions through the manipulation of the tire, but for the present purposes it should suffice to indicate that the radial load on the tire will be between 200 and 2,000 pounds.

It is of course important to create as low a friction resistance as possible to the underside of the belt at the area against which the tire presses and that is the function of the hydrostatic bearing 20. The bearing is best illustrated in FIGS. 2 and 3. The bearing includes a tank 30 which is open at the top as at 31. The tank has upper edges 32 forming a rim over which the upper run 22 of the belt passes. Plastic seals 33 extend around the rim 32.

Below the rim 32 of the tank is a manifold 40. The manifold has a plurality of transverse bores 41, fifteen being shown in the illustrated form of the invention. Each bore is connected by a plurality of vertical bores 42 to nozzles 43, each nozzle 43 presenting a flange 44 of such diameter that all flanges of the nozzles are in contact with adjacent flanges, thereby presenting a substantially continuous bed of nozzles over which the upper run 22 of the belt will pass.

The transverse bores 41 intersect, at the center of the manifold, a large diameter longitudinal bore 45 which is connected at each side to elbow joints 46 and 47. The elbow joints are in turn connected through a Y connection to a pump 50. The low pressure side of the pump is connected to a reservoir 51.

Below the manifold 40 is a water tray 55 which provides a cavity 56 below the manifold. The perimeter of the manifold is formed as a trough 57 which is connected to the cavity 56 in the tray 55 by vertical oval-shaped drains 58 at each end of the tank.

The cavity 56 is connected by a drain tube 60 to the reservoir 51. The drain includes an elbow 61 immediately below the water tray 55. A high pressure nozzle 63 is inserted into the drain through a fitting 64 in the elbow 61. The nozzle 63 is connected by tubing 65 to the high pressure side 66 of the pump 50.

The tank 30 is preferably provided with a drip tray 67 around the rim 32 and a spray pan 68 extending longitudinally a short distance underneath the belt at the position where the belt moves onto the hydrostatic bearing. The drip tray and spray pan have suitable drain connections and serve to keep a substantial portion of the water off of the rest of the mechanism.

The operation of the invention can best be understood by reference to the diagrammatic view of FIG. 4 taken in conjunction with the figures previously described.

The upper run 22 of the belt passes over the hydrostatic bearing 20. The belt is wide enough to cover the tank 30 and the entire seal 33 around the rim 32 of the tank.

Water is introduced under pressure through the passageway 45 in the manifold 40 and is distributed to all of the nozzles. The nozzles 43 direct jets of water directly against the underside of the belt and tend to raise it a substantial distance above the rim 32. If no differential pressure were applied, the spacing of the belt over the nozzles would be about 0.050". However, the high pressure water tapped from the high pressure side 66 of the pump is directed through the nozzle 63 into the drain line of the tank 30, thus urging the water in the drain line toward the reservoir at a velocity greater than that which would obtain from gravity flow. The effect of directing the high pressure water into the drain line through the nozzle 63 is to reduce the pressure within the tank 30 to something below atmospheric pressure. Thus, a pressure differential is created across the belt between the upper surface and the under surface of the belt. That pressure differential forces the belt 13 toward the nozzles 43 and creates a gap of approximately 0.001".

As a tire is brought into contact with the belt during the running of a rolling resistance test, the belt remains substantially flat. The pressure of the tire on the belt cannot close that 0.001" gap appreciably further. Thus, the tire sees a flat surface quite similar to that which it would encounter in actual operating conditions on a highway.

An alternative form of creating the desired pressure differential between the upper and lower surfaces of the belt is illustrated in FIG. 5. As shown in FIG. 5, the reservoir 51 is sealed. An air pump 70 having a low pressure side 71 is connected to a space 72 above the water in the reservoir to reduce the pressure in that space to something below atmosphere. That low pressure condition is communicated directly to the underside of the belt by the drain line 60 and tank 30. A pressure differential of 6 to 12 inches is sufficient to bring the belt down toward to nozzles to create the 0.001" gap.

Having described our invention, we claim:

1. Apparatus for measuring rolling resistance comprising,
   an endless belt,
   drum means for supporting and driving said endless belt with an upper run in a horizontal attitude,
   means for mounting a tire over said upper run and forcing it into engagement with said upper run,
   a water bearing below said upper run,
   said water bearing including a plurality of nozzles,
   means including a pump for directing water from said nozzles against said upper run,
   means creating a pressure differential between the upper and lower surfaces of said upper run to force the lower surface into close proximity to said nozzles.

2. Apparatus as in claim 1 further comprising,
   a tank, open at the top, supporting said nozzles,
   a seal around the upper edge of said tank, between said tank and said upper run,
   a reservoir between said pump and said nozzles,
   and a drain connecting said tank to said reservoir.

3. Apparatus as in claim 2 in which said pressure differential creating means comprises,
   tubing connecting the high pressure of said pump to said drain,
   and a nozzle inserted in said drain directing high pressure water toward said reservoir.

4. Apparatus as in claim 2 in which said pressure differential creating means comprises,
   means creating a vacuum in said reservoir.

5. In a tire testing machine wherein a tire is pressed against the upper run of an endless belt, the endless belt being supported on a hydrostatic bearing created by a plurality of nozzles directing water against the underside of said belt,
   the method of minimizing the localized deflection of said belt when a tire is pressed against it comprising the step of
   creating a substantially greater pressure on the upper surface of said belt than on its undersurface.

* * * * *